United States Patent [19]

Spencer et al.

[11] Patent Number: 5,278,977
[45] Date of Patent: Jan. 11, 1994

[54] INTELLIGENT NODE RESIDENT FAILURE TEST AND RESPONSE IN A MULTI-NODE SYSTEM

[75] Inventors: Joel R. Spencer; Anthony J. Booth, both of Middlesex, Mass.

[73] Assignee: Bull HN Information Systems Inc., Billerica, Mass.

[21] Appl. No.: 671,323

[22] Filed: Mar. 19, 1991

[51] Int. Cl.$^5$ .............................................. G06F 11/20
[52] U.S. Cl. ...................................... 395/575; 370/16; 371/8.2
[58] Field of Search .................... 371/8.2, 11.2; 370/16, 370/16.1, 15, 13; 395/575, 650

[56] References Cited

U.S. PATENT DOCUMENTS

| | | | |
|---|---|---|---|
| 4,879,716 | 11/1989 | McNally et al. | 371/8.2 |
| 4,928,279 | 5/1990 | Muroi | 371/11.2 |
| 4,984,240 | 1/1991 | Keren-Zvi et al. | 371/8.2 |
| 4,999,829 | 3/1991 | Fife, Jr. et al. | 370/16 |
| 5,095,421 | 3/1992 | Freund | 395/650 |
| 5,105,420 | 4/1992 | Ardon et al. | 370/16 |
| 5,124,984 | 6/1992 | Engel | 370/94.1 |
| 5,140,689 | 8/1992 | Kobayashi | 395/575 |

*Primary Examiner*—Charles E. Atkinson
*Attorney, Agent, or Firm*—Gerald J. Cechony; Gary D. Clapp; John S. Solakian

[57] ABSTRACT

In a distributed, multi-node system for communicating between a plurality of distributed terminals and one or more central computers, some of which specify command and control information to the nodes, intelligent means are provided in the nodes to enable the nodes to test their internal communication channels and the communication channels to their associated distributed terminals independently of the central computers, and to reconfigure themselves independently of the central computers, substituting spare channels for identified malfunctioning ones. Conditions detectable by or within the node may initiate such testing. This means comprises a script interpreter which causes the node to execute scripts previously provided to it. New scripts may be provided to the nodes from a central computer.

6 Claims, 7 Drawing Sheets

INTELLIGENT NODE RESIDENT FAILURE TEST AND RESPONSE IN A MULTI-NODE SYSTEM

FIELD OF THE INVENTION

This invention pertains to distributed transaction processing networks, and particularly to means for enhancing testability and resiliency of such networks.

BACKGROUND OF THE INVENTION

Distributed transaction processing networks, accepting transactions from widely dispersed POS (point of service) terminals, are known in the prior art. Typically such networks are provided with a distributed set of local line concentrators and a centralized means of monitoring and control; typically the centralized monitoring and control means initiate testing at far-flung points in the network and initiate actions to work around any detected faults.

As such networks become larger in geographical scope (on the order of entire continents), the centralized monitoring and control means are able to focus their attention on each particular point in the network less and less frequently (in practice, in the present embodiment, on the order of once every ten minutes); thus, a failure in a POS terminal, a line concentrator, or the path interconnecting them might go undetected by the central control means and therefore uncorrected for a period of time that is unacceptably long in a retail POS setting.

SUMMARY OF THE INVENTION

The present invention overcomes the testing and correction delays inherent in the prior art by providing means in the distributed line concentrators and POS terminals (i.e., independent of the centralized control and monitoring means) for initiating and running loop tests, interpreting the results of those tests to determine whether there is in fact a failure, and reconfiguring to work around such failure; these means are pre-programmable, enabling scheduling and configuration to be determined independently for each distributed location, and without any need to wait for direction from the centralized control means of the network.

THE PREFERRED EMBODIMENT

General Overview

Figure 1:
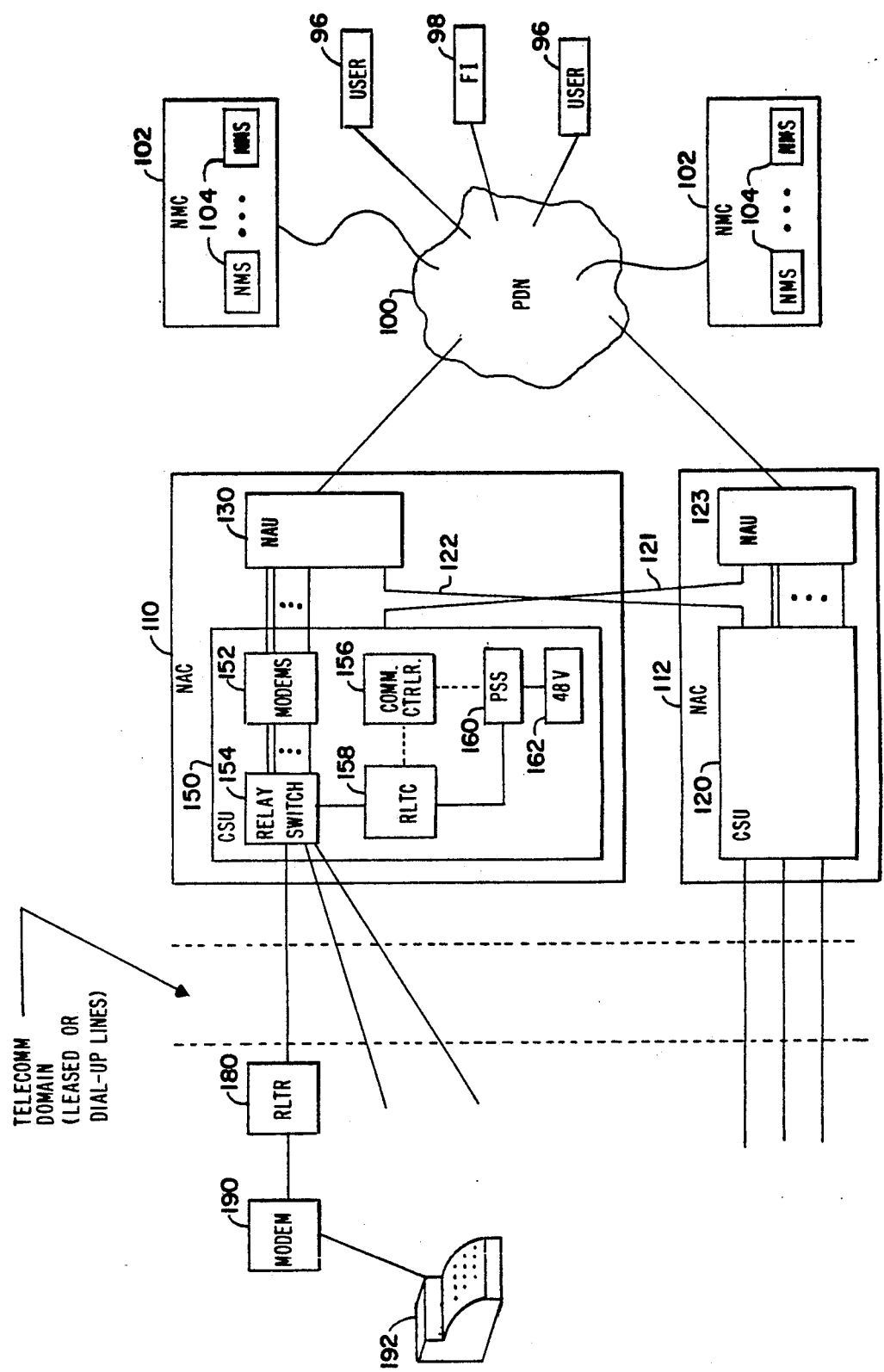
FIG. 1 depicts the Network Access Controller (NAC) of the present invention and a typical path from a point-of-service (POS) terminal through the NAC to a public data network of a continental EFTPOS (electronic funds transfer/point of service) system.

The invention is initially being practiced within an EFTPOS communications network system, which is intended to interconnect Users 96 over a large geographical area (perhaps on the order of an entire continent), and to accommodate four user communities:

CONSUMERS, who carry plastic cards (credit cards or debit cards);

MERCHANTS, who accept payment by plastic cards;

FINANCIAL INSTITUTIONS, who issue plastic cards and/or manage accounts for both consumers and merchants;

SERVICE PROVIDERS, who supply equipment and management services to the merchants. (Typically, larger merchants or financial institutions may function as service providers to other merchants or financial institutions.)

In the present embodiment, the "backbone" of the system is a packet switched network (the "public data network ("PDN 100")) provided by a communications carrier; the carrier has no more involvement in the management of the system than is necessary to provide and facilitate this backbone.

Typical uses of the system by a consumer might be to make a purchase from a merchant and charge the purchase to an account with a financial institution identified by his plastic card, or to execute retail banking transactions at an Automated Teller Machine (ATM) in an account identified by his plastic card. In either case, communications over the network verify the existence and viability of the consumer's account with a financial institution, and post the current transactions to that account.

The primary purpose of the system is to convey information concerning financial transactions between POS terminals 192 and the computer of a particular financial institution ("FI"98). At the POS terminal a consumer inserts a plastic card identifying his account with a financial institution, and also a personal identification number ("PIN") which verifies that he is authorized to use that account, and the merchant enters identification regarding a retail sale. The computer of the financial institution ("FI") which carries that account sends back either an acknowledgement or rejection of the transaction. The POS terminals are distributed over a wide geographical area. The FI computers might be anywhere in that geographical area.

The POS terminals are connected by telephone lines to network access controllers (NACs) which are typically located at telephone company central offices, and thus there typically is a NAC within several miles of a POS terminal. Where there is a large concentration of POS terminals, as in large shopping malls, there may be a NAC located in the shopping mall. The number of NACs required to service the entire geographical area may be on the order of several hundred or even several thousand.

Each NAC concentrates data from up to 144 telephone lines onto the PDN, which transports the data to the appropriate FI computer, and transports back acknowledgements or rejections.

Network Management Centers (NMC's) 102 are also connected to the PDN. Each NMC comprises one or more Network Management Systems (NMS's) 104. An NMS transmits configuration directives over the network, and monitors operation of the network and units connected to it.

Service providers may enter configuration and status requests at terminals and may receive status information back. Service provider terminals communicate over the PDN with the NMS's, which honor the service providers' requests.

A single business entity might function as both a merchant and a financial institution, as when a large retail organization issues its own "house" credit card or debit card, or when a bank places ATM's in operation in order to provide retail banking services to consumers. In such cases, the business entity's dual roles of merchant and financial institution are typically kept separated.

Merchants gain access to the system by contracting with a service provider organization to obtain the equipment and management that will enable them to access the network. A service provider might be a specialized equipment supplier with no other role in the EFTPOS system; alternatively, larger merchants and financial institutions may function as service providers to other merchants and financial institutions.

The machine-readable plastic cards used by consumers carry sufficient information to identify the financial institution which manages the consumer's account, and to identify that account. The consumer authorized to use the card knows a personal identification number ("PIN") assigned by the financial institution to the account, but which is not recorded on the card; entry of the correct PIN number at the point of sale is considered equivalent to the presentation of the card-holder's signature.

The network is used to exchange discrete messages between users (e.g., between a merchant and a financial institution). The network may thus be thought of as "connectionless", and there is no notion of a "conversation" between users—each message is a self-contained entity. A response to a message is regarded as another self-contained message; applications entities at each end are responsible for correlation of the messages.

Overview of the Network Access Controller (NAC)

Hardware details concerning the NAC may be found in U.S. Pat. No. 4,879,716, "Resilient Data Communications System", issued Nov. 7, 1989 to Lance McNally et al.

As has been discussed, Network Access Controllers (NACs) are distributed throughout the geographical area served by the EFTPOS system; there may be hundreds or even thousands of them. Each NAC controls all POS equipment connected to it and routes messages between merchants and the PDN for transmission to the financial institution domain. Routing of messages involves determining the required financial institution for each message from the POS equipment based on card information included in the message and registered routing tables specific to the given equipment. Messages from the financial institution contain a destination address, which is used to determine the appropriate POS terminal address for onward routing.

Figure 3:
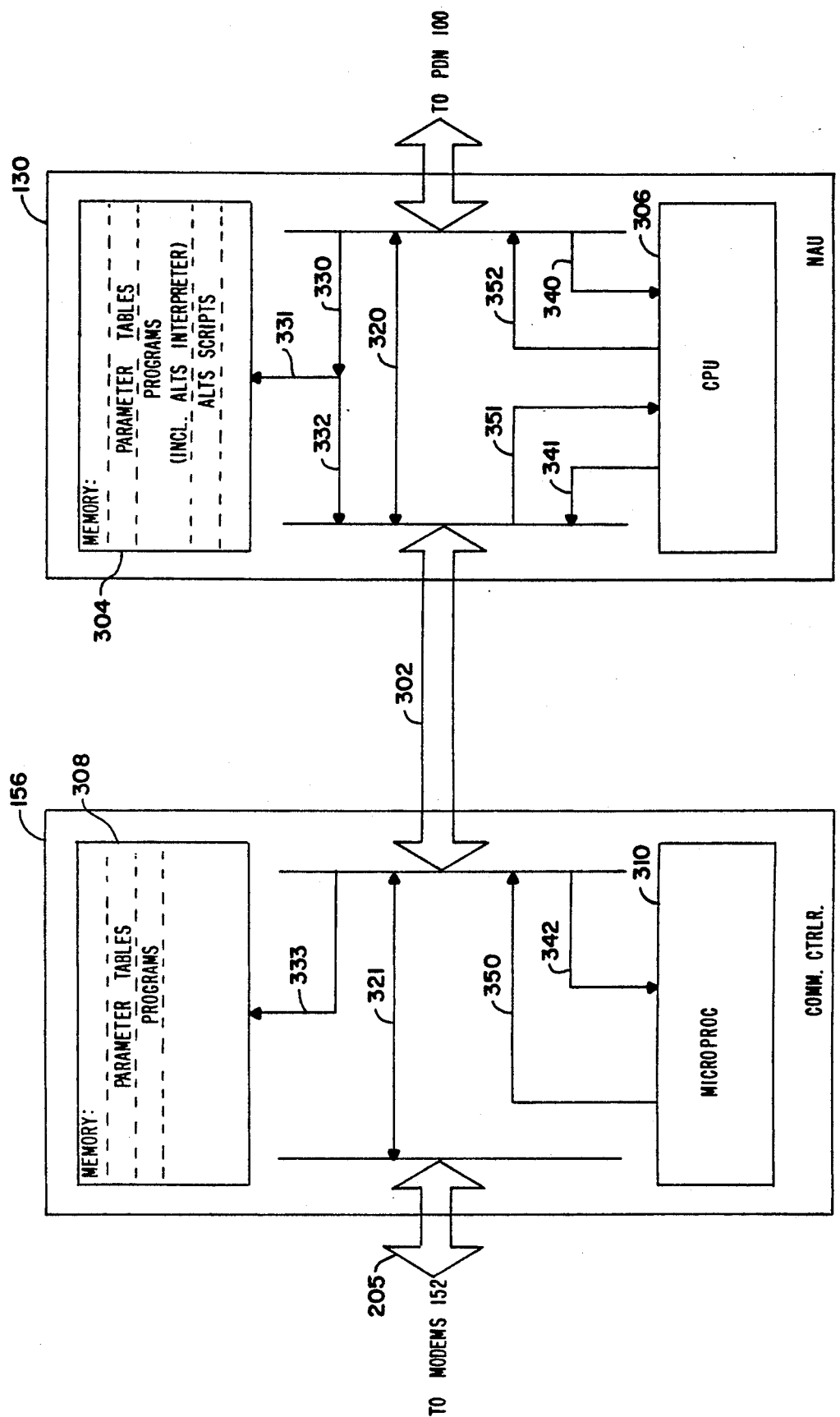
FIG. 3 provides further detail within the Network Access Unit (NAU) and Communications Controller contained within the NAC of FIG. 1.

As is seen in FIG. 1, a NAC includes two major functional units: a network access unit (NAU), and a Communications Server Unit (CSU). In the interests of resiliency, the CSU is constructed such that all critical components are duplicated, as will be discussed in detail further below; in the event of an internal failure, a redundant component may be activated. In the event that NAU 130 fails, it is seen in FIG. 3 that CSU 150 may contact a remote NAU 123 (by leased or dial-up lines 122) and request that it be "adopted"—the remote NAU 123 will then service CSU 150 until its local NAU 130 is returned to service. (Similarly, in the event of failure of NAU 123, CSU 120 may contact NAU 130 via lines 121 and request that it be adopted.)

A NAC is responsible for controlling access to the network by POS equipment, and for relaying messages between merchants and financial institutions. Access by POS equipment is controlled on the basis of a "registered hours of service" parameter for each POS device, and the ability of the POS devices to present valid identification information at the time of sign-on.

It has been mentioned that the NAC functions as a line concentrator, interfacing up to 144 telephone lines from POS terminals 192 to the Public Data Network (PDN) 100. (POS terminals may be connected to the phone lines in point-to-point or multidrop topology.) NAC 110 is seen to have a connection from its NAU 130 to the PDN 100. (The NAU 130 is a digital computer; in the present embodiment, a Bull DPS-6+computer.) The connection to the PDN 100 carries X.25 packets bidirectionally; each packet contains routing information. Incoming packets may relate to a POS transaction and thus be coming from a financial institution and be destined for POS terminals, or they may be coming from the NMS and relate to the configuration and control of the NAC. (As such, incoming packets may contain software modules or scripts (to be discussed further below) to be stored in the computer memories of the NAU or CSU to control execution of the NAU and CSU.) Outgoing packets may similarly be transaction-related and bound for a financial institution, or configuration- or status-related and bound for the NMS.

The NAU maintains internal configuration tables that correlate between routing information in the packets and its configuration of modems 152 (as governed by communications controller 156 and relay switch 154, to be discussed below) vis-a-vis phone lines connecting POS terminals 192. Incoming transaction packets from PDN 100 are routed to the appropriate one of modems 152 for transmission to the appropriate one of POS terminals 192. Incoming command and control packets are acted upon internally by the NAU 130, perhaps resulting in the forwarding of instructions to communications controller 156. Transaction packets originated by any of POS terminals 192 and presented to NAU 130 by modems 152 are multiplexed onto the connection to PDN 100, with appropriate routing information to route them to the appropriate financial institutions. Configuration and status related packets originating within NAU 130 (perhaps in response to communication initiated by communications controller 156) are also multiplexed onto the connection to PDN 100, with appropriate routing information to route them to an NMS.

As will be discussed further below, means are provided to run loop tests as specified in CCITT recommendation V.54. (See CCITT Blue Book, Volume VIII, Fascicle VIII.I, Geneva, 1989, ISBN 92-61-03661-9, pp 375-91.) In support of one of these tests, also provided in the CSU 150 is a "certified" 48 volt power supply 162 associated with power supply system (PSS) 160. Forty-eight volts dc is to be applied to the phone line through remote line test controller (RLTC) 158 in conjunction with the "remote premises" test to be discussed below; most countries have regulations regarding the certification of supplies of voltage to be applied to phone lines to prevent a telephone user's coming into contact with a potentially lethal voltage.

Figure 2:
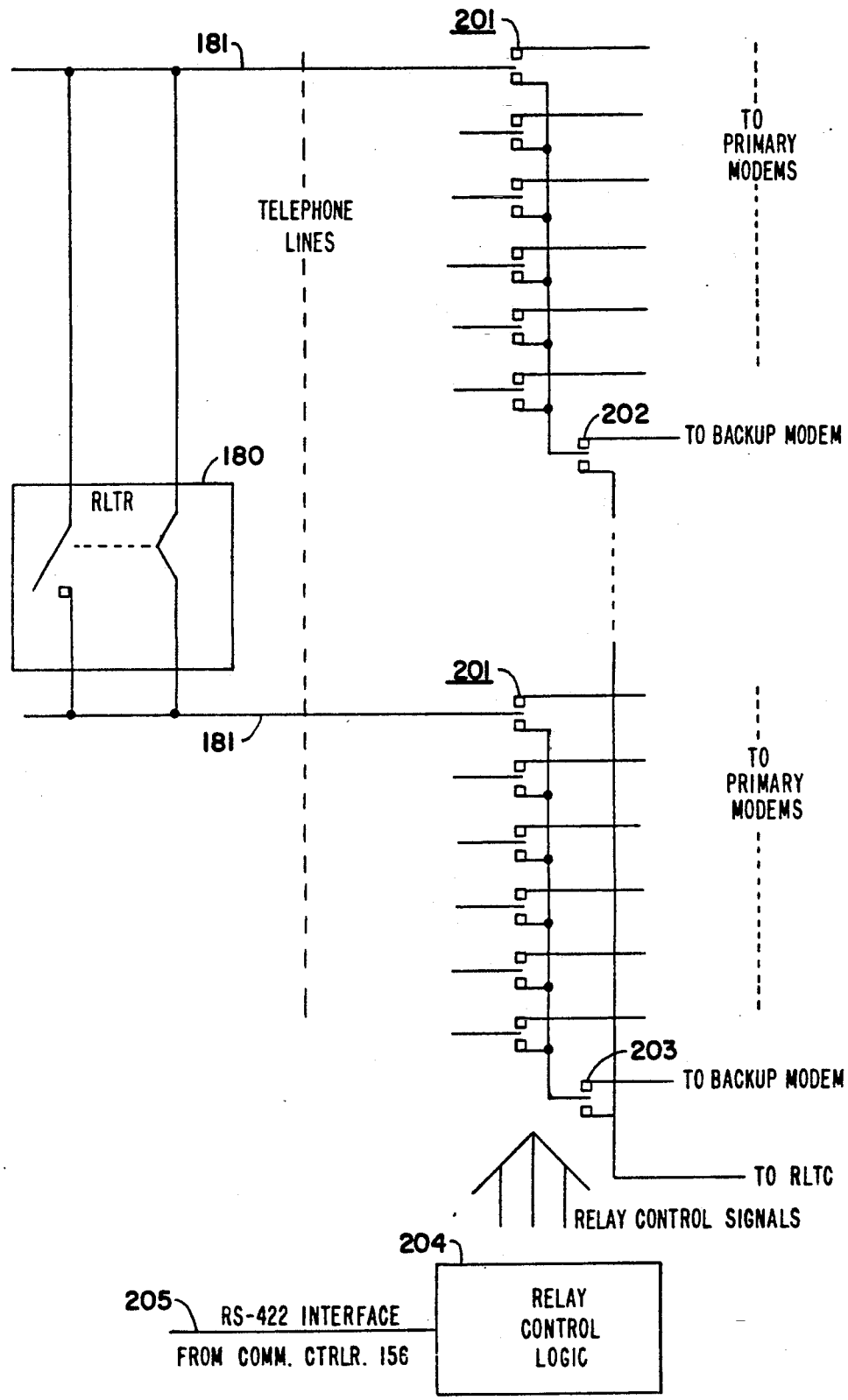
FIG. 2 shows further detail of the relay switch contained within the NAC depicted in FIG. 1.

FIG. 2 shows further detail within relay switch 154. For each phone line coming NAC 110 from POS terminals, a spdt relay 201 is provided; a relay 201 is connected such that in its normal state it connects the phone line to a modem 152 (not shown on FIG. 2) designated the primary modem for that phone line. The present embodiment provides "6+1 redundancy" of modems; that is, a backup modem can be substituted for any of a group of six modems. (As many such groups of six can be provided as the designer wishes.) If one of the first six primary modem fails, the corresponding one of relays 201 can be switched (under control of relay control logic 204) connecting the corresponding phone line to the input of relay 202; if relay 202 is in its normal state, that phone line is then connected to a backup modem.

FIG. 3 provides further detail regarding flow through the NAU 130 and the Communications Controller 156. They are interconnected by a VME bus 302. Both are digital computers and are seen to have processing means (306 and 310 respectively) and memory means (304 and 308 respectively). As those in the art well know, a computer's memory means contains (among other things) programs for controlling the operation of its processing means. Optionally, parameters may be provided which are consulted by the programs; program operation can be dynamically modified by modifying parameters. Programming is provided in the present a embodiment which controls processing means 306 and 310 such that data flow through NAU 130 and Communications Controller 156 will follow paths shown in high-level schematic form on FIG. 3 and discussed here:

Transaction-related data from POS terminals coming in through modems 152 will take path 321 through the comm. ctrlr. 156 and be routed over VME bus 302 to the NAU, and over path 320 for transmission over PDN 100; transaction-related data from a financial institution will traverse that path in the opposite direction to reach a POS terminal.

Polling requests from the NMS are routed to CPU 306 over path 340; if they require response from microprocessor 310, they are routed thereto over paths 341, 302, and 342.

Status and error messages (whether in response to polling requests or unsolicited and resulting from local detection of fault conditions) originating in microprocessor 310 are routed on paths 350, 302, and 351 to CPU 306, whence, along with such messages originating in CPU 306, they travel path 352 to be transmitted onto PDN 100. Parameters, programs, and scripts (to be discussed below) can be downloaded from an NMS; those addressed to NAU 130 are loaded into memory 304 over paths 330 and 331, while those for comm. ctrlr. 156 are sent over paths 330, 331, 332, 302, and 333 to memory 308.

The present embodiment incorporates capabilities for running loop tests modeled after the CCITT V.54 loop tests. With reference to FIG. 1, these tests are:

Local I/O interface test. Modeled on CCITT V.54 loop 1, this test sends digital test data from NAU 130 to a selected one of modems 152; the modem is instructed to a loop this digital data back to NAU 130 for verification. (It will be recalled that a modem converts digital data to analog data; in this test, the data do not reach that stage.)

Local modem test. Modeled on CCITT V.54 loop 3, this test sends digital test data from NAU 130 to a selected one of modems 152; the modem is instructed to convert the data to analog and then loop the data back toward NAU 130, which will result it in its being converted back to a digital data before it is returned to NAU 130 for verification.

Remote terminal modem test. Modeled on CCITT V.54 loop 2, this test sends digital test data from NAU 130 to a selected one of modems 152, which is instructed to convert the data to analog and forward it through relay switch 154, over the phone line connected thereto, through RLTR 180 (to be discussed further below) to modem 190; modem 190 converts the analog data to digital; modem 190 is instructed to loop the data back over the same path, with the result that it is converted back to analog by modem 190, passed back through RLTR 180, over the phone line, through relay switch 154 and to the selected one of modems 152 which converts it back to digital data and returns it to NAU 130 for verification.

Remote premises test. This test is functionally equivalent, but not identical, to CCITT V.54 loop 4, which requires a four-wire phone line for its implementation. The remote premises test will work with a two-wire phone line, and utilizes remote line test controller (RLTC) 158 located in the NAC in conjunction with remote line test receiver (RLTR) 180 located at the remote (merchant's) premises. (In present practice, it is incorporated in the "box" (typically mounted on a wall) to which the merchant connects a telephone cord from his modem.) RLTR 180 is normally passive (i.e., it does not affect the characteristics of the phone line), but, as indicated in FIG. 2, it is responsive to the presence of 48 volts dc on the phone line connect the two wires 18 of the phone line together. To run the remote premises test, RLTC 158 is directed to place the certified 48 volts dc from 48 volt supply 162 onto the phone line, and to originate analog test data. With reference to FIG. 2, relay 203 is switched, as are the appropriate ones of relays 202 and 201 so as to connect RLTC 158 to the phone line which it is desired to test. Responsive to the presence of 48 volts on the phone line, RLTR 180 connects the two wires 181 of the line together, thus looping the data back through the same path to RLTC 158 for verification.

Automatic Line Testing Syntax (ALTS):

Given the testability, redundancy and configurability built into the NAC hardware, as discussed above, companion software is provided to exploit these features; testing of components is possible either automatically or upon request, and is configurable for each POS terminal. Loopback tests can be requested by personnel at the NMS; such requests may also originate from SAF's and may be forwarded by the NMS pending determination by the NMS that the equipment being tested is within the purview of the particular service provider initiating the request.

To facilitate these operations, a "script" language is provided called "ALTS"—Automatic Line Testing Syntax. A script language may be generally thought of as an interpretive programming language; system administrators at the NMSs provide statements in the ALTS script language which are interpreted by the program running in the NAU and translated at run time (as opposed to "compiling", which takes place ahead of time) into machine-language instructions for effectuating the script-language statements.

One of the software components resident in the NAU is an ALTS interpreter, which interprets scripts furnished in the ALTS script language and directs the NAC accordingly.

Among the scripts that may have been downloaded previously are scripts that direct the NAU to perform tests upon the occurrence of criteria that are detectable within the NAC. That is, these tests are run without any specific direction from the NMS. Such tests are generally known as "automatic loopback tests". Since an NMS may be overseeing hundreds of NACs that may be hundreds or even thousands of miles from the NMS, it can be very beneficial for a NAC to initiate line testing on its own upon detecting a failure indication (for example) as opposed to having to wait until the next time it is routinely polled by the NMS, which in the present embodiment may be on the order of every ten minutes. The thresholds of what shall be considered to constitute failure is configurable for each individual POS terminal.

Automatic loopback tests can be specified under the following criteria:

Time of Day Testing: Once a day, at a time specified ahead of time by the network administrator, all available channels in a station group are subject to an automatic set of tests. For example, in the early hours of the morning shortly before a business day begins, the functionality of paths can be verified.

Initialization: Upon initialization of a CSU channel, a configurable set of tests is automatically performed. This would typically occur when a CSU channel is first commissioned.

Channel Failure: When a channel failure is suspected, a configurable set of tests is automatically performed. (Channel failures are detected by means known lo those in the communications arts: failures in data transmission are detected by means of checksum algorithms embodied in the communication layers that support data transmission. Absence of data transmission is detected by (i) lack of a requisite acknowledgement (ACK) signal in response to a transmitted message, or (ii) lack of a "heartbeat" signal, known to those in the art.

Any particular NAC may be provided with ALTS scripts which will run any desired combination of the available tests, and may use the results of the tests to reconfigure the NAC or to request further instruction from the NMS.

The tests may be specified to run on the "primary channel" or the "backup channel". As discussed above, spare modems are provided, along with relay switching to reconfigure each channel; the presently-configured channel is referred as the primary channel, and there is a backup channel available for each primary channel. For the remote terminal modem test, the option is provided to run it "deferred"—that is, after a preset delay. This is provided because the POS terminals are provided with an internal power-on reset; that is, if the remote terminal modem test is being run in response to a terminal's not responding to polls due to the merchant's having turned it off and on again in order to reset it. If the remote terminal modem test is attempted while the terminal (and its modem) are turned off, the remote terminal modem test is sure to fail; the deferred remote terminal modem test may then be attempted, it being presupposed that the merchant will have turned his terminal back on during the delay time.

NOTE: In the following discussion of ALTS directives and parameters, it is presupposed that one skilled in the art can program the appropriate interpreting software to cause the NAU to make the appropriate responses.

When a NAC is initially being "configured" (those skilled in the art will realize that one aspect of configuration refers to the software and parameters that are loaded) three parameters are downloaded from the NMS that specify which tests are to be run automatically for each of the three triggering events previously mentioned (time of day, initialization, failure detection). Each of these parameters is in the form of an eight-bit bitmap with the following meaning:

| BIT | TEST |
| --- | --- |
| 1 (MSB) | Remote terminal modem via Primary Channel |
| 2 | RLT |
| 3 | Remote terminal modem via Backup Channel |
| 4 | Local modem via Backup Channel |
| 5 | Local I/O interface via Backup Channel |
| 6 | Local modem via Primary Channel |
| 7 | Local I/O interface via Primary Channel |
| 8 (LSB) | Remote terminal modem Deferred (Primary Channel) |

The parameter denoting which tests to perform at initialization of the CSU is called -AUT_INIT.

The parameter denoting which tests to perform at a particular time of day is called -TIME_OF_TEST, and is followed by a word containing HHMM, where HH specifies the hour of the day at which to initiate the specified tests, and MM specifies the minute of the hour. This parameter has a default value of zero, which indicates that no tests are to be run as a function of the time of day.

The parameter that denotes which tests are to be performed when a station or channel failure is suspected is called -AUT_FAIL.

Loop tests may be requested from the NMS by virtue of an NMS command.

Whenever a test session is triggered, a bit map is generated known as the Test Requested Summary. As tests are executed, bits so indicating are set in a bit map known as the Test Executed Summary. As will be discussed below, these summary bit maps are used by the software to determine which tests are to be run, and which have been run.

As each test is run, a sixteen-bit parameter called Detailed Test Results is recorded to note the outcome of the test, as follows:

| HEX Value | Meaning |
| --- | --- |
| 0 × 00 | Loopback successful |
| 0 × 01 | Insufficient buffer space |
| 0 × 02 | Timeout |
| 0 × 04 | Error on receive |
| 0 × 08 | Error on transmit |
| 0 × 10 | MCP session failure |
| 0 × 21 | Modem not configured |
| 0 × 22 | Invalid test loop level |
| 0 × 23 | Channel not available for test |
| 0 × 24 | Modem under configuration |
| 0 × 25 | Test already in progress |
| 0 × 26 | Channel not configured |

It will be seen that values less than 0 × 20 indicate errors detected whilst performing the tests, while values greater than 0 × 20 indicate errors in the test request itself.

In the present embodiment, ALTS processing is carried out in two main phases: fixed test order logic, and programmable action syntax. As just described, the network administrator may specify what tests are to be run and under what conditions; the actual running of the tests is in an order not programmable by the network administrator. Determination of actions to be taken after running the tests is programmable by the network administrator.

Figure 4A:
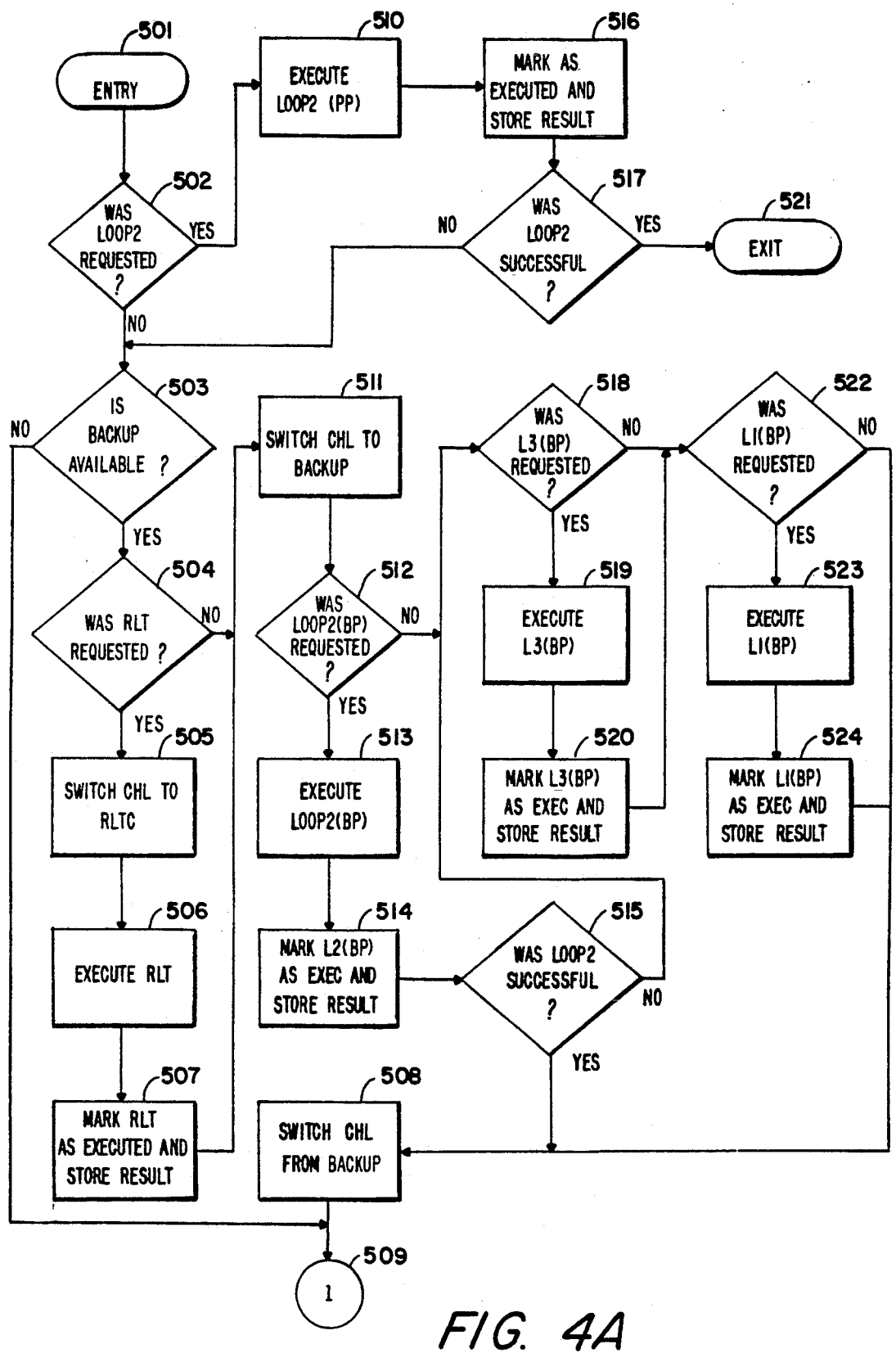
FIGS. 4a and 4b contain a flow chart of ALTS fixed test order logic.
Figure 4B:
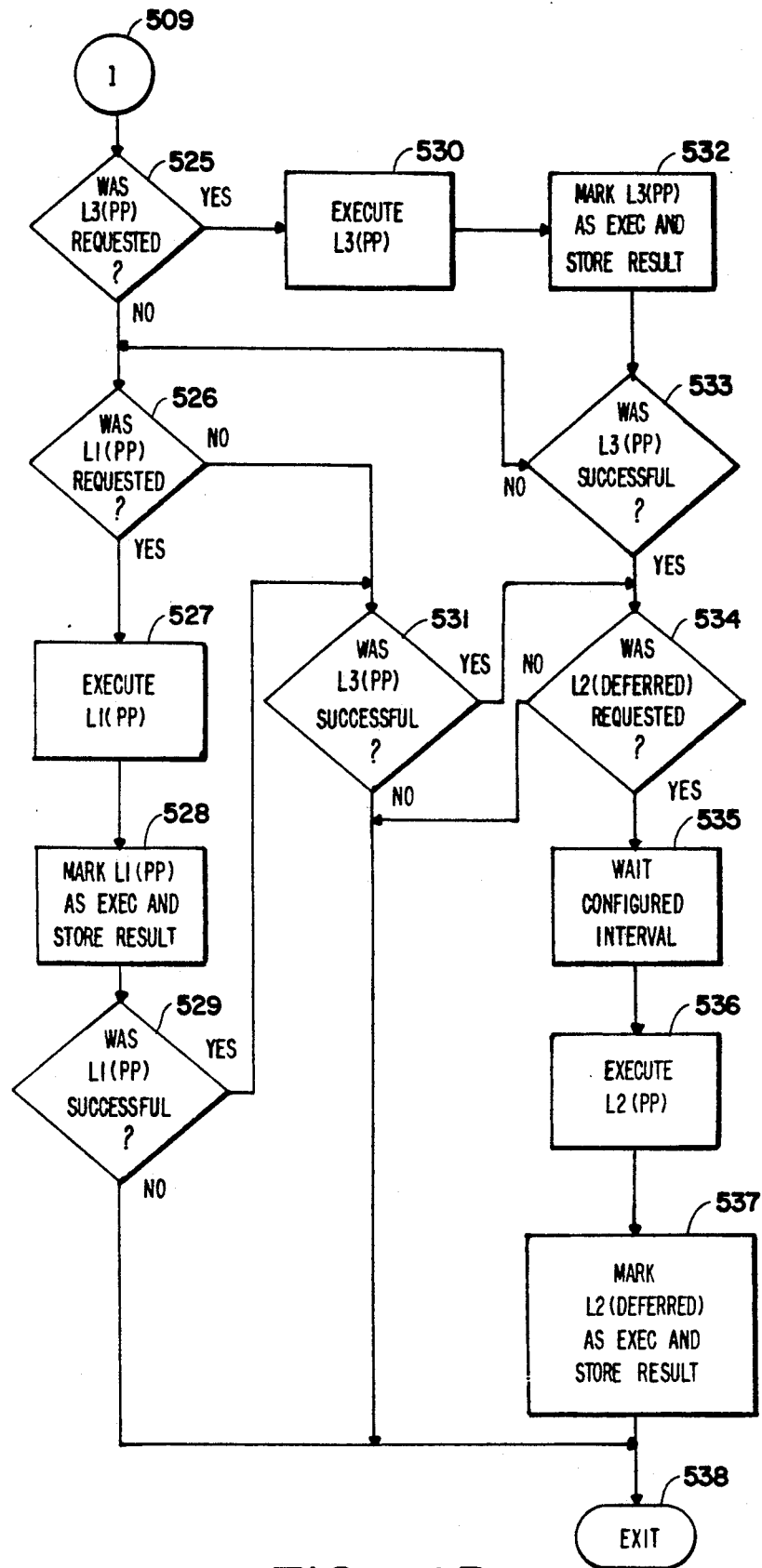

FIGS. 4a and 4b provide a flow chart of the fixed test order logic. As noted above, this logic is entered (block 501) under the direction of CPU 306 either upon a time of day test having specified for a channel by parameter -TIME_OF_TEST and the occurrence of the specified time of day; testing upon initialization having been specified by parameter -AUT_INIT and initialization being performed upon the channel; or tests being specified by parameter -AUT_FAIL and a failure having been detected on the channel. Block 502 interrogates the Test Requested Summary to determine whether Loop 2 (Remote terminal modem test) was requested; if so, block 510 executes the code requisite to carry out that test on the primary channel (or "primary path", denoted "PP" on the flowchart), and block 516 enters a bit in the Test Executed Summary to flag that it has been performed. Block 517 exits if the test was successful; perusal of the loop test descriptions will reveal that loop 2 is the widest ranging of all the tests—if the loop 2 test running on the primary channel did not detect any failure, the others surely will not either, so there is no reason to perform any other of the tests.

If block 517 did not exit, block 503 is executed to determine whether backup is available. If so, the remaining blocks on FIG. 4a determine whether RLT, loop 2 on the backup channel, loop 3 (local modem test) on the backup channel, or loop 1 (local I/O interface test) on the backup channel have been requested; these are executed as requested, and results marked in the Test Executed Summary. Connector 509 transfers control to FIG. 4b, where loops 1, 2 deferred, and 3 similarly are run if they have been requested. When the flow exits at block 538, the Tests Executed Summary indicates which tests have been performed, and the Test Results parameter for each test that has been run indicates the outcome of the test.

Once the requested tests have been run, the aforementioned programmable action syntax ALTS script is run to check the outcomes of the tests and determines action to be taken as a result. The script may be provided under the direction of the network administrator; he may cause a different script to be downloaded to each NAC; therefore, the network administrator has a great deal of flexibility in determining what constitutes a failure and what response is to be taken as a result at each individual NAC.

The ALTS script must ultimately be resolved into a series of instructions, each comprising four octets (i.e., four eight-bit numbers). The content of the octets is as follows:

| OCTET | CONTENT |
|---|---|
| 1 | Sequence number |
| 2 | Instruction type |
| 3 | Instruction object |
| 4 | Switch sequence number (i.e., the sequence number of the instruction to be done next) |

The instruction types are:

| Instn | Short Name | Meaning |
|---|---|---|
| 3 | StGroup | Examine Station Group Type |
| 4 | Usage | Examine Station Group Channel Usage |
| 5 | Asynch | Examine Station Group Asynch Type |
| 6 | Allow | Examine if backup is Allowed |
| 7 | Available | Examine if backup is Available |
| 8 | Cause | Examine Cause of Auto Testing |
| 9 | Fail | Examine if Primary Channel Failure |
| A | Achieve | Examine test results Achieved |
| B | Bye | Exit with requested action |
| C | Channel | Examine Channel type |
| D | Done | Examine if test was Done |
| E | Entreat | Examine if test requested (Entreated) |
| F | Forward | Go Forward to switch number |

INSTRUCTION OBJECTS

Instruction Objects for Instruction Types A, D and E

If the instruction type is A (Examine test results Achieved), D (Examine if tests was Done) or E (Examine if test requested (Entreated) then the instruction object has the following meanings:

| Bits 1-4 of Instrn Obj | Bits 5-8 of Instrn Obj | Meaning |
|---|---|---|
| A | | primary channel |
| B | | backup channel |
| | 1 | Loop1 |
| | 2 | Loop2 |
| | 3 | Loop3 |
| | D | RLT |

Instruction Objects for Instruction Type B

If the instruction type is B (Exit with requested action) then, the instruction object has the following meanings:

| Instrn Obj | Meaning |
|---|---|
| A | exit and attempt to bring up prim chl |
| B | exit and switch to backup |
| D | exit and mark channel as down |
| F | exit, mark chl down, issue unsl info PDU |

Before an instruction object of B (exit and switch to backup) is performed the following tests are conducted.
test whether backup is allowed for this channel
test whether the backup port is available for use
test whether the protection switch is available.

All of the above must be TRUE for a switch to backup to occur.

Instruction Objects for Instruction Type C

If the instruction type is C (Examine Channel type) then, the instruction object has the following meanings:

| Instrn Obj | Meaning |
|---|---|
| 0 | unknown mode |
| 1 | digital multipoint |
| 2 | dial-out |
| 3 | point to point (leased) |
| 4 | dial-in |
| 5 | dial-both |
| 6 | leased, rev chl (send on prim rcv on sec) |
| 7 | leased, rev chl (send on sec rcv on prim) |
| 9 | secondary |
| A | analog multipoint |

INSTRUCTION OBJECTS FOR INSTRUCTION TYPES 6, 7 AND 9

If the instruction type is 6 (Examine if backup is Allowed), 7 (Examine if backup is Available) or 9 (Examine if Primary Channel Failure) then the instruction object has no meaning.

INSTRUCTION OBJECTS FOR INSTRUCTION TYPE 8

If the instruction type is 8 (Examine Cause of Auto Testing) then the instruction object has the following meaning:

| Instrn Obj | Meaning |
|---|---|
| 1 | Initialisation Tests |
| 2 | TOT Tests |
| 3 | Channel Failure |
| 4 | Station Failure |
| 5 | Command Request |

INSTRUCTION OBJECTS FOR INSTRUCTION TYPE 3

If the instruction type is 3 (Examine Station Group Type) then the instruction object has the following meaning:

| Instrn Obj | Meaning |
|---|---|
| 1 | leased, synchronous |
| 2 | dial, synchronous |
| 3 | leased, asynchronous |
| 4 | leased, four wire |
| 5 | dial back |
| 6 | dial, asynchronous |
| 7 | dial out |

INSTRUCTION OBJECTS FOR INSTRUCTION TYPE 4

If the instruction type is 4 (Examine Station Group Channel Usage) then the instruction object has the following meaning:

| Instrn Obj | Meaning |
|---|---|
| 1 | Normal Response Mode |
| 2 | Asynchronous |

| Instrn Obj | Meaning |
|---|---|
| 4 | NZ Prtcls (Mixed NZP and OSI) |
| 5 | NZ Prtcls (Alt NZP and OSI) |
| 6 | NZ Prtcls (Only) |

INSTRUCTION OBJECTS FOR INSTRUCTION TYPE 5

If the instruction type is 5 (Examine Station Group Asynchronous Type) then the instruction object has the following meaning:

| Instrn Obj | Meaning |
|---|---|
| 1 | Asynch Term Type A (Westpac) |
| 2 | Asynch Term Type B |
| 3 | Asynch Term Type C (Canada) |
| 4 | Asynch Term Type D |
| 5 | Asynch Term Type E (ANZ) |
| 6 | Asynch Term Type F |
| 7 | Asynch Term Type G |
| 8 | Asynch Term Type H |

SWITCHING LOGIC

Most ALTS instructions cause a switch to the instruction contained in the switch octet if the result of the command execution is TRUE. If the result is FALSE the next sequential instruction is executed.

The exceptions to this rule are the F(Forward) and B(Bye) instructions. The F instruction always switches to the instruction number contained in the switch octet. The switch octet has no meaning in the B instruction.

The following table summarises the meaning of TRUE and FALSE in the ALTS environment:

| Instruction | Meaning of TRUE | Meaning of FALSE |
|---|---|---|
| 6 (Allow) | auto backup allowed for this channel | auto backup not allowed for this channel |
| 7 (Available) | auto backup is avail | auto backup is not avail |
| 8 (Cause) | instrn object is the cause for analysis | instrn object is NOT the cause for analysis |
| 9 (Fail) | primary channel in use when failure occurred | backup channel in use when failure occurred |
| A (Achieve) | test executed successfully | test did not execute successfully |
| B (Bye) | not applicable | not applicable |
| C (Channel) | channel type matches | channel type does not match instruction object |
| D (Done) | test executed | instruction object test not executed |
| E (Entreat) | test requested | test not requested |
| F (Forward) | not applicable | not applicable |

This scripting language allows great flexibility in the scripts that may be downloaded to a NAC and which will control testing and reconfiguration within the NAC without direct intervention of the NMS. There follows a typical, exemplary script:

| | |
|---|---|
| ALTS | -SEQ_NUM 2 |
| | -EXIT DOWN |
| ALTS | -SEQ_NUM 3 |
| | -EXIT START_BACK |
| ALTS | -SEQ_NUM 4 |
| | -EXIT START_PRIM |
| ALTS | -SEQ_NUM 5 |
| | -REASON INIT |
| | -SWITCH_NUM 20 |
| ALTS | -SEQ_NUM 6 |

-continued

| | |
|---|---|
| | -REASON TOT |
| | -SWITCH_NUM 60 |
| ALTS | -SEQ_NUM 7 |
| | -REASON CHL_FAIL |
| | -SWITCH_NUM 100 |
| ALTS | -SEQ_NUM 8 |
| | -REASON STN_FAIL |
| | -SWITCH_NUM 140 |
| ALTS | -SEQ_NUM 9 |
| | -REASON COMMAND |
| | -SWITCH_NUM 4 |
| ALTS | -SEQ_NUM 20 |
| | -TEST_OK PRIM_LOOP2 |
| | -SWITCH_NUM 4 |
| ALTS | -SEQ_NUM 21 |
| | -TEST_OK DEFER_LOOP2 |
| | -SWITCH_NUM 4 |
| ALTS | -SEQ_NUM 22 |
| | -TEST_OK BACK_LOOP2 |
| | -SWITCH_NUM 3 |
| ALTS | -SEQ_NUM 23 |
| | -TEST_DONE BACK_LOOP2 |
| | -SWITCH_NUM 2 |
| ALTS | -SEQ_NUM 24 |
| | -TEST_REQ BACK_LOOP2 |
| | -SWITCH_NUM 2 |
| ALTS | -SEQ_NUM 25 |
| | -TEST_OK RLTD |
| | -SWITCH_NUM 35 |
| ALTS | -SEQ_NUM 26 |
| | -TEST_DONE RLTD |
| | -SWITCH_NUM 2 |
| ALTS | -SEQ_NUM 27 |
| | -TEST_REQ RLTD |
| | -SWITCH_NUM 2 |
| ALTS | -SEQ_NUM 28 |
| | -TEST_OK PRIM_LOOP3 |
| | -SWITCH_NUM 4 |
| ALTS | -SEQ_NUM 29 |
| | -TEST_DONE PRIM_LOOP3 |
| | -SWITCH_NUM 35 |
| ALTS | -SEQ_NUM 30 |
| | -TEST_REQ PRIM_LOOP3 |
| | -SWITCH_NUM 4 |
| ALTS | -SEQ_NUM 31 |
| | -TEST_OK PRIM_LOOP1 |
| | -SWITCH_NUM4 |
| ALTS | -SEQ_NUM 32 |
| | -TEST_DONE PRIM_LOOP1 |
| | -SWITCH_NUM 35 |
| ALTS | -SEQ_NUM 33 |
| | -FORWARD |
| | -SWITCH_NUM 4 |
| ALTS | -SEQ_NUM 35 |
| | -TEST_OK BACK_LOOP3 |
| | -SWITCH_NUM 3 |
| ALTS | -SEQ_NUM 36 |
| | -FORWARD |
| | -SWITCH_NUM 180 |
| ALTS | -SEQ_NUM 60 |
| | -TEST_OK PRIM_LOOP2 |
| | -SWITCH_NUM 4 |
| ALTS | -SEQ_NUM 61 |
| | -TEST_OK DEFER_LOOP2 |
| | -SWITCH_NUM 4 |
| ALTS | -SEQ_NUM 62 |
| | -TEST_OK BACK_LOOP2 |
| | -SWITCH—NUM |
| ALTS | -SEQ_NUM 62 |
| | -TEST_OK BACK_LOOP3 |
| | -SWITCH_NUM 3 |
| ALTS | -SEQ_NUM63 |
| | -TEST_DONE BACK_LOOP2 |
| | -SWITCH_NUM 2 |
| ALTS | -SEQ_NUM 64 |
| | -TEST_REQ BACK_LOOP2 |
| | -SWITCH_NUM 2 |
| ALTS | -SEQ_NUM65 |
| | -TEST_OK RLTD |
| | -SWITCH_NUM 75 |
| ALTS | -SEQ_NUM 66 |
| | -TEST_DONE RLTD |
| | -SWITCH_NUM 2 |
| ALTS | -SEQ_NUM 67 |
| | -TEST_REQ RLTD |
| | -SWITCH_NUM 2 |
| ALTS | -SEQ_NUM 68 |
| | -TEST_OK PRIM_LOOP3 |
| | -SWITCH_NUM 4 |
| ALTS | -SEQ_NUM 69 |
| | -TEST_DONE PRIM_LOOP3 |
| | -SWITCH_NUM 75 |
| ALTS | -SEQ_NUM 70 |
| | -TEST_REQ PRIM_LOOP3 |
| | -SWITCH_NUM 4 |
| ALTS | -SEQ_NUM 71 |
| | -TEST_OK PRIM_LOOP1 |
| | -SWITCH_NUM 4 |
| ALTS | -SEQ_NUM 72 |
| | -TEST_DONE PRIM_LOOP1 |
| | -SWITCH_NUM 75 |
| ALTS | -SEQ_NUM 73 |
| | -FORWARD |
| | -SWITCH_NUM 4 |
| ALTS | -SEQ_NUM 75 |
| | -TEST_OK BACK_LOOP3 |
| | -SWITCH_NUM 3 |
| ALTS | -SEQ_NUM 76 |
| | -FORWARD |
| | -SWITCH_NUM 180 |
| ALTS | -SEQ_NUM 100 |
| | -TEST_OK PRIM_LOOP2 |
| | -SWITCH_NUM 4 |
| ALTS | -SEQ_NUM 101 |
| | -TEST_OK DEFER_LOOP2 |
| | -SWITCH_NUM 4 |
| ALTS | -SEQ_NUM 102 |
| | -TEST_OK BACK_LOOP3 |
| | -SWITCH_NUM 3 |
| ALTS | -SEQ_NUM 103 |
| | -TEST_DONE BACK_LOOP2 |
| | -SWITCH_NUM 2 |
| ALTS | -SEQ_NUM 104 |
| | -TEST_REQ BACK_LOOP2 |
| | -SWITCH_NUM 2 |
| ALTS | -SEQ_NUM 105 |
| | -TEST_OK RLTD |
| | -SWITCH_NUM 115 |
| ALTS | -SEQ_NUM 106 |
| | -TEST_DONE RLTD |
| | -SWITCH_NUM 2 |
| ALTS | -SEQ_NUM 107 |
| | -TEST_REQ RLTD |
| | -SWITCH_NUM 2 |
| ALTS | -SEQ_NUM 108 |
| | -TEST_OK PRIM_LOOP3 |
| | -SWITCH_NUM 4 |
| ALTS | -SEQ_NUM 109 |
| | -TEST_DONE PRIM_LOOP3 |
| | -SWITCH_NUM 115 |
| ALTS | -SEQ_NUM 110 |
| | -TEST_REQ PRIM_LOOP3 |
| | -SWITCH_NUM 4 |
| ALTS | -SEQ_NUM 111 |
| | -TEST_OK PRIM_LOOP1 |
| | -SWITCH_NUM 4 |
| ALTS | -SEQ_NUM 112 |
| | -TEST_DONE PRIM_LOOP1 |
| | -SWITCH_NUM 115 |
| ALTS | -SEQ_NUM 113 |
| | -FORWARD |
| | -SWITCH_NUM 4 |
| ALTS | -SEQ_NUM 115 |
| | -TEST_OK BACK_LOOP3 |
| | -SWITCH_NUM 3 |
| ALTS | -SEQ_NUM 116 |
| | -FORWARD |
| | -SWITCH_NUM 180 |
| ALTS | -SEQ_NUM 140 |
| | -TEST_OK PRIM_LOOP2 |
| | -SWITCH_NUM 4 |
| ALTS | -SEQ_NUM 141 |
| | -TEST_OK DEFER_LOOP2 |
| | -SWITCH_NUM 4 |

| | -continued | |
|---|---|---|
| ALTS | -SEQ_NUM 142<br>-TEST_OK BACK_LOOP3<br>-SWITCH_NUM 3 | |
| ALTS | -SEQ_NUM 143<br>-TEST_DONE BACK_LOOP2<br>-SWITCH_NUM 2 | |
| ALTS | -SEQ_NUM 144<br>-TEST_REQ BACK_LOOP2<br>-SWITCH_NUM 2 | |
| ALTS | -SEQ_NUM 145<br>-TEST_OK RLTD<br>-SWITCH_NUM 155 | |
| ALTS | -SEQ_NUM 146<br>-TEST_DONE RLTD<br>-SWITCH_NUM 2 | |
| ALTS | -SEQ_NUM 147<br>-TEST_REQ RLTD<br>-SWITCH_NUM 2 | |
| ALTS | -SEQ_NUM 148<br>-TEST_OK PRIM_LOOP3<br>-SWITCH_NUM 4 | |
| ALTS | -SEQ_NUM 149<br>-TEST_DONE PRIM_LOOP3<br>-SWITCH_NUM 155 | |
| ALTS | -SEQ_NUM 150<br>-TEST_REQ PRIM_LOOP3<br>-SWITCH_NUM 4 | |
| ALTS | -SEQ_NUM 151<br>-TEST_OK PRIM_LOOP1<br>-SWITCH_NUM 4 | |
| ALTS | -SEQ_NUM 152<br>-TEST_DONE PRIM_LOOP1<br>-SWITCH_NUM 155 | |
| ALTS | -SEQ_NUM 153<br>-FORWARD<br>-SWITCH_NUM 4 | |
| ALTS | -SEQ_NUM 155<br>-TEST_OK BACK_LOOP3<br>-SWITCH_NUM 3 | |
| ALTS | -SEQ_NUM 156<br>-FORWARD<br>-SWITCH_NUM 180 | |
| ALTS | -SEQ_NUM 180<br>-EXIT START_PRIM | |

Figure 5A:
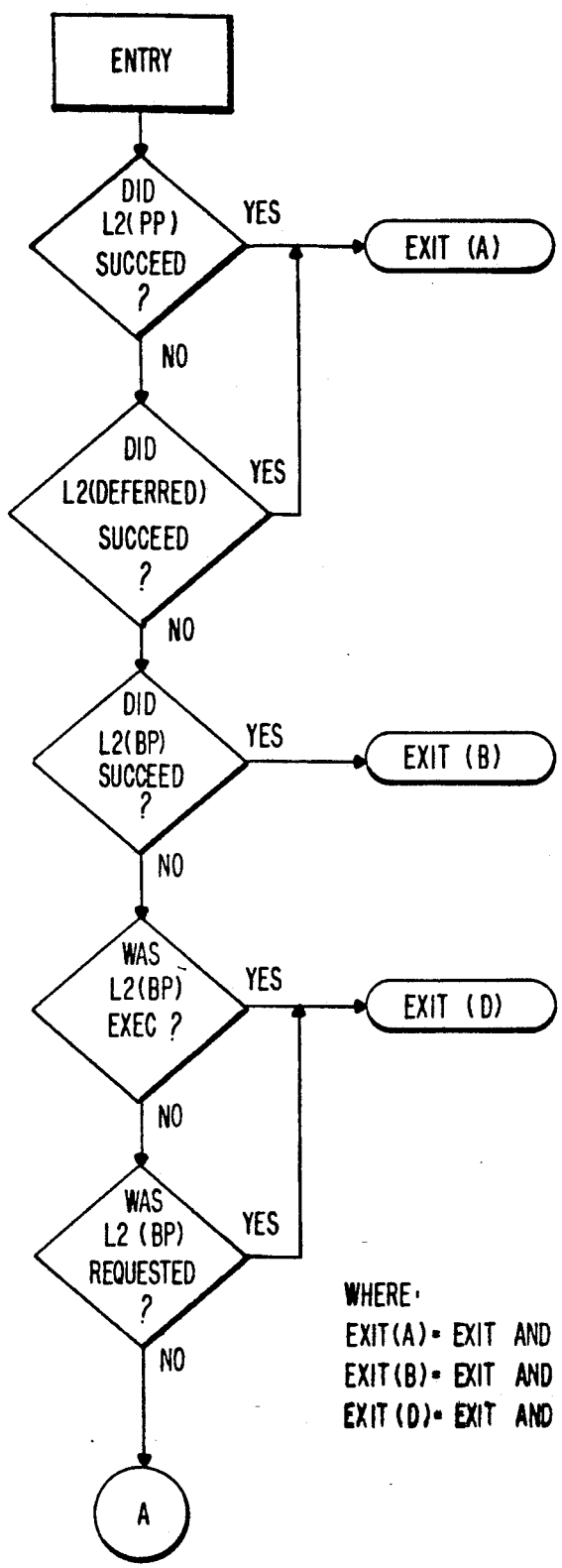
FIGS. 5a and 5b contain a flow chart of ALTS programmable action syntax.
Figure 5B:
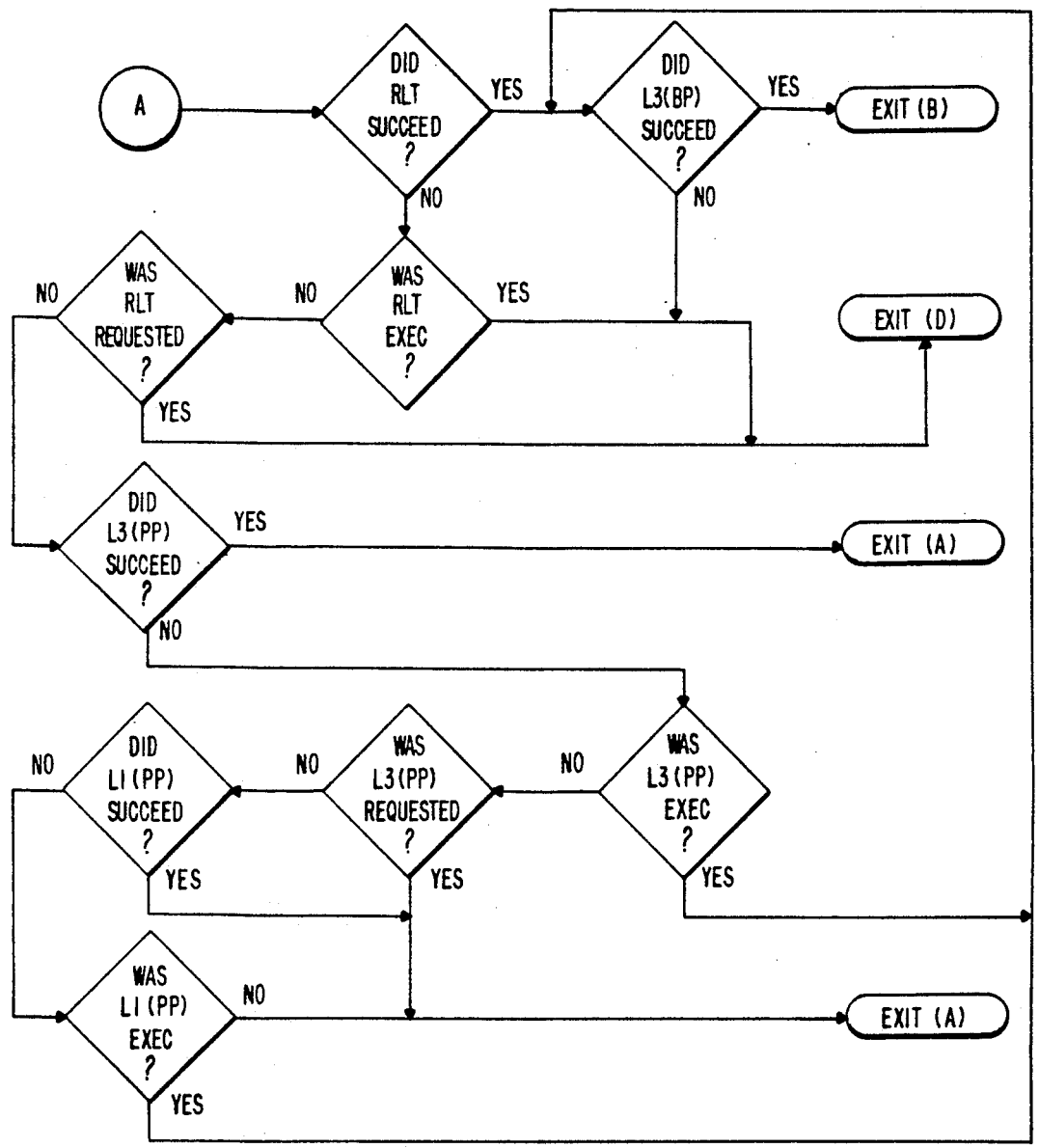

FIGS. 5a and 5b contain a flow chart of the actions specified by the exemplary script. The flow chart is self-explanatory to one skilled in the art. Correlation of the flow chart with its previously given script illustrates the manner in which the network administrator, who causes the scripts to be downloaded to the NACs, may specify which test results are to be checked and what actions are to be taken based thereon.

Those skilled in the art will perceive other advantages of the invention. The invention is intended to be embraced by the appended claims and not limited by the foregoing description of a particular embodiment.

What is claimed is:

1. In a distributed transaction processing network comprising:

a data network having a plurality of users connected thereto by telephone lines for carrying messages from any user of the plurality of users selectively to any other user of the plurality of users through the telephone lines;

a plurality of terminals for entering or receiving information, each terminal having transmitting-/receiving means for transmitting data onto and receiving data from a telephone line;

a plurality of network access controllers (NACs) each for interfacing to the data communication network through a plurality of internal channels data to and from the telephone lines connected to POS terminals, each telephone line connected to one of a first plurality of the plurality of internal channels;

the NACs having the ability to detect the occurrence of data transmission errors on the plurality of internal channels and to detect the absence of data transmission on the plurality of internal channels;

the NACs having the ability to test their plurality of internal channels by performing loop tests thereon;

the NACs and the receiving/transmitting means in the terminals, in conjunction, having the ability concurrently to test an internal channel of the plurality of internal channels in the NAC, a telephone line, and a receiving/transmitting means of a terminal by performing a loop test;

the NACs having reconfiguration means able to selectively connect any of a second plurality of internal channels of the plurality of internal channels in place of any of the first plurality of internal channels of the plurality of internal channels;

central control means connected to the data communication network for monitoring operation, for requesting the NACs to initiate loop tests, and forwarding configuration directions to network components;

the NACs including:

programmable control means to which the reconfiguration means are connected and responsive for controlling the configuration and operations of internal channels;

memory means for receiving and storing programs to which the programmable control means are responsive;

the programmable control means responsive to the programs for:

testing particular internal channels of the plurality of internal channels upon detection of any of a plurality of predetermined conditions;

interpreting the results of said testing to identify a malfunctioning one of the first plurality of internal channels of the plurality of internal channels; and connecting one of the second plurality of internal channels of the plurality of internal channels in place of a malfunctioning one of the first plurality of internal channels of the plurality of internal channels, whereby the NAC preserves its functionality without current intervention of the central control means.

2. The transaction processing system recited in claim 1, wherein further said plurality of of predetermined conditions comprises a time of day, initialization of a channel, and detection of a failure on a channel.

3. The transaction processing network recited in claim 1, wherein further;

each terminal has associated with it a remote line test receiver connected between the terminal's receiving/transmitting means and the telephone line, the telephone line being a two-wire telephone line, the remote line test receiver normally being passive and not altering the characteristics of the telephone line, and having means responsive to a certain state of the telephone line for connecting the two wires of the telephone line together;

means in the NAC for placing the telephone line in said certain state thus signaling the remote line test receiver to connect the two wires of the telephone line together, whereby a loop test may be preformed on the telephone line independent of the terminal and independent of the receiving/transmitting means associated with the terminal.

4. The transaction processing system recited in claim 3 wherein further;

the programmable control means contains means responsive to prestored parameter words or to parameter words downloaded to the NAC over the data network for specifying which loop tests are to be run under each of the particular conditions.

5. The transaction processing system as described in claim 3 wherein further:

the mans in the NACs for interpreting results of loop tests independently of the central control means comprises means in the programmable control means for interpreting prestored instruction words or instruction words downloaded to the NAC over the data network from the central control means for specifying the actions to be taken in the NAC in response to the outcome of the loop tests, whereby a NAC may perform a response to a test as specified from the central control means without requiring the current intervention of the central control means.

6. The transaction processing network recited in claim 1, wherein further the programmable control means is responsive to instructions in machine language, and the programs comprise:

one or more scripts in a higher level language; and
a script interpreter for translating said scripts into said machine language.

* * * * *